United States Patent [19]
McCormick et al.

[11] Patent Number: 6,023,723
[45] Date of Patent: Feb. 8, 2000

[54] METHOD AND SYSTEM FOR FILTERING UNWANTED JUNK E-MAIL UTILIZING A PLURALITY OF FILTERING MECHANISMS

[75] Inventors: William B. McCormick; David Kopans, both of Charlottesville, Va.

[73] Assignee: Accepted Marketing, Inc., New York, N.Y.

[21] Appl. No.: 08/995,860

[22] Filed: Dec. 22, 1997

[51] Int. Cl.[7] .............................. G06F 17/20; G06F 17/00; G06F 13/38; G06F 15/17

[52] U.S. Cl. ........................ 709/206; 709/203; 709/207; 709/231; 709/238; 709/240; 709/249; 709/242; 707/1; 707/7; 707/10; 707/100; 707/102; 707/200; 707/206

[58] Field of Search .......................... 707/7, 10, 1, 206, 707/102, 200, 100; 706/47; 709/206, 300, 203, 242, 231, 207, 240, 238, 249

[56] References Cited

U.S. PATENT DOCUMENTS

| | | | |
|---|---|---|---|
| 5,283,856 | 2/1994 | Gross et al. | 706/47 |
| 5,377,354 | 12/1994 | Scannell et al. | 395/673 |
| 5,619,648 | 4/1997 | Canale et al. | 395/200.36 |
| 5,632,011 | 5/1997 | Landfield et al. | 345/326 |
| 5,634,005 | 5/1997 | Matsuo | 395/200.36 |
| 5,764,899 | 6/1998 | Eggleston et al. | 709/203 |
| 5,826,022 | 10/1998 | Nielsen | 709/206 |
| 5,864,684 | 1/1999 | Nielsen | 709/206 |

FOREIGN PATENT DOCUMENTS

| | | |
|---|---|---|
| 0720333 | 7/1997 | European Pat. Off. . |
| 0825752 | 2/1998 | European Pat. Off. . |
| 0886227 | 12/1998 | European Pat. Off. . |
| 0886228 | 12/1998 | European Pat. Off. . |
| 0899918 | 3/1999 | European Pat. Off. . |

OTHER PUBLICATIONS

Carlos Carrillo, SPAM Exterminator 2.1 (Unisyn's E–mail Filter), Window Sources vol. 5, p. 140, 1997.

S.J. Vaughan–Nichols, Eudorable Web Mail [E–Mail Software], BYTE (International Edition), vol. 22, Issue 2, p. 140, Feb. 1997.

Mike Avery, Mimesweeper neatly cleans up e–mail, Web Content, InfoWorld, V19, n25, p. 64A(2), ISSN: 0199–6649, http://www.infoworld.com, Jun. 1997.

Cyber Snoop v. 3.0, Pearl Software Inc., Apr. 1999.

BSDI MailFilter, Berkeley Software Design Inc., Oct. 1998.

*Primary Examiner*—Frank J. Asta
*Assistant Examiner*—William C. Vaughn, Jr.
*Attorney, Agent, or Firm*—Hoffman, Wasson & Gitler PC

[57] ABSTRACT

A system and method of filtering junk e-mails. The user is provided with or compiles a list of e-mail addresses or character strings which the user would not wish to receive to produce a first filter. A second filter is provided including names and character strings which the user wishes to receive. Any e-mail addresses or strings contained in the first filter will be automatically eliminated from the users system. Any e-mail addresses or strings contained in the second filter would be automatically sent to the users "In Box". Any e-mail not provided in either of the filter lists will be sent to a "Waiting Room" for user review. If this user review results in the user rejecting any e-mail, the address as well as specific character strings included in this e-mail would be transmitted to a central location to be included in a master list. This master list is periodically sent to each of the users allowing the first filter to be updated.

23 Claims, 7 Drawing Sheets

METHOD AND SYSTEM FOR FILTERING UNWANTED JUNK E-MAIL UTILIZING A PLURALITY OF FILTERING MECHANISMS

FIELD OF THE INVENTION

The present invention relates to an electronic or e-mail filter system as well as a method of filtering unwanted e-mail messages.

BACKGROUND OF THE INVENTION

No cogent argument can legitimately be made refuting the fact that technology while generally benefitting mankind, does have its occasional deficiencies. This is certainly true with respect to the communications industry. Unfortunately, each technology advancement relating to the ease and facility of providing communications between various individuals or companies have created minor headaches or problems. Although used sporadically since the early 1920's the utilization of the airplane in the mail industry since the end of World War II allowed individuals and communities on both the east and west coast to be linked with one another. Mail sent from New York to Los Angeles would be received within two or three days from the date that the communication was originally posted. Although the use of airmail had a salutatory affect upon the communication between individuals and other entities, various companies seized upon this relatively inexpensive means of communication to inundate the public with a large number of junk mail solicitations. Unfortunately, to the chagrin of many of these junk mail operators, the public could generally determine which mail was important and which was not, based upon a number of factors such as the type of envelopes which were utilized, the return address of the sender as well as the manner in which the sendee was addressed. Therefore, many of these solicitations were never opened and were merely discarded.

The deregulation of the telecommunications industry as well as the increased usage of "800" type numbers has resulted in an increased number of unwanted telephone solicitations. While tending to be an annoyance, once the called party determines that they are not interested in any solicitations or the type of solicitations offered by the caller, the called party can merely hang up his or her receiver.

Increased use of facsimile machines in both the work environment as well as personal facsimile machines at home created another avenue for unwanted solicitations. Since technology allowed a single letter of solicitation to be transmitted to a large number of facsimile machines with ease, it is easy to see that facsimile machine solicitations became an annoying problem, particularly when the individuals machine was receiving a large number of correspondences utilizing the receivers own paper. Furthermore, these solicitations were tying up the users telephone line so that important messages were delayed or never received. Due to an outcry by the public, legislation was passed to forbid these types of unsolicited communications directed to facsimile machines.

The explosion in the personal computer "PC" industry has provided solicitors with yet another manner of sending unsolicited messages. More and more businesses as well as individual users are connected to one another over the Internet and Intranet 11. Similar to the situation with respect to facsimile machines, a solicitor can compose a message and send it on the Internet and Intranet 11 to a relatively large number of personal computers. Although these e-mail messages are not necessarily reproduced on paper in the manner that the facsimile messages were previously received, the receipt of these messages would prevent other legitimate messages from being received in a timely manner. Therefore, it is clear that a system and method of filtering unwanted e-mail messages must be developed to shield the PC user from the annoyance of unsolicited junk e-mail.

U.S. Pat. No. 5,619,648 issued to Canale et al is directed to a technique for reducing the amount of junk e-mail received by a user in an e-mail system. As illustrated with respect to FIG. 1 of the Canale et al patent, a user 105 who wishes to reduce the amount of junk e-mail which is received, would be provided with a mail filter 109. A mail item 119 in the system would include a standard e-mail message as well as a recipient specifier 121 which uses non-address information to further describe the recipients who would receive the e-mail as well as a referral list 127 which is a list of potential recipients who pass the e-mail on and of recipients to whom the e-mail was provided. The recipients specifier 129 also includes a recipient description 125. If the recipient description specifies a recipient which is of the same kind as that specified by the user model 113, the mail filter 109 adds the mail item 119 to filtered mail 115. The mail filter 109 can utilize the information in the referral list 127 to indicate a chain of referrals which resulted in the message being directed to the user 105. While this system can be utilized to reduce a users junk e-mail, it does not necessarily include a filter technique in which mail sent by a sender included in an approved guest list filter would be designated as such when received by the user. Additionally, this system is not utilized in a manner allowing an updated master list of junk e-mail addresses or senders to be developed and transmitted to other users in the system.

U.S. Pat. Nos. 5,093,918 issued to Heyen et al; 5,283,856 issued to Gross et al; 5,377,354 issued to Scannell et al; 5,632,013 issued to Landfield et al and 5,634,005 issued to Matsuo are all directed to various systems for sorting and managing electronic mail or similar messages. However, similar to the Canale et al patent, these patents do not describe a method or system in which electronic e-mail can be effectively filtered by the user as well as compiling an updatable master list of unwanted e-mail transmitters which is then transmitted to the end user for filter purposes.

SUMMARY OF THE INVENTION

The present invention overcomes the problems of the prior art by utilizing a method and system for filtering unwanted junk e-mail sent to the user's computer. The user would include various addresses or other defining characteristics in a "No Admittance List" as well as a plurality of addresses in a "Guest List". An incoming e-mail whose addresses are included in the "No Admittance List" would be immediately discarded. Any address in the "Guest List" would be immediately forwarded to an "In Box". Any address not included in either the "No Admittance List" or the "Guest List" would be forwarded to a "Waiting Room". The user would periodically review the e-mail included in the "Waiting Room". Based upon this review, the user would either discard the e-mail to a "Trash Bin" or would send the e-mail to the "In Box". The addresses of e-mails which were discarded after the users review could be automatically added to the "No Admittance List". Additionally, the address of any e-mail added to the "In Box" after the user's review could also be automatically added to the "Guest List". Addresses of e-mail which are discarded would be periodically sent to a filter server thereby adding the addresses to a master list. This master list is then periodically transmitted to all of the users in the system through a download server.

BRIEF DESCRIPTION OF THE DRAWINGS

These and other attributes of the present invention will become more apparent in light of the following detailed

DESCRIPTION OF THE PREFERRED EMBODIMENTS

Figure 1:
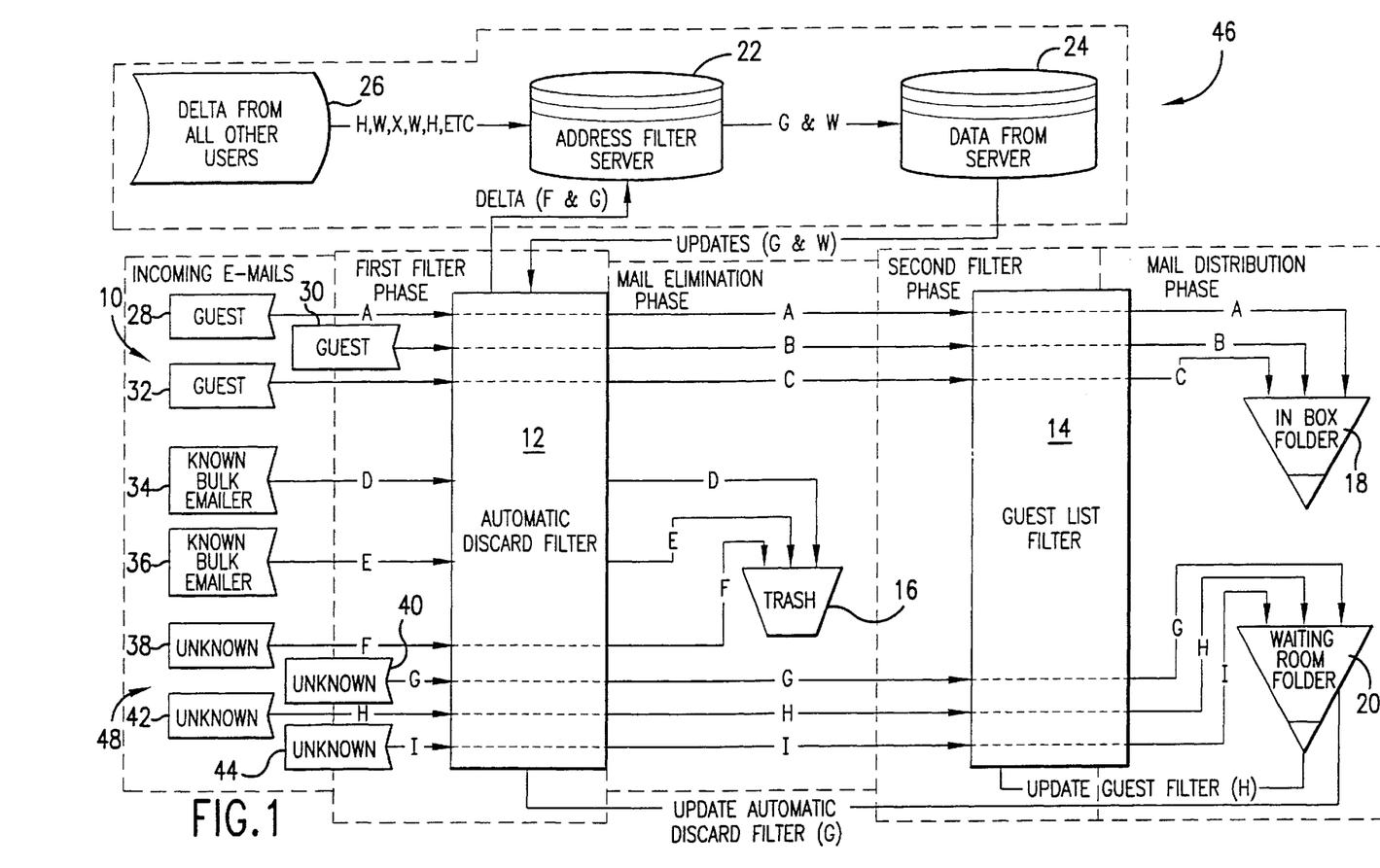
FIG. 1 is a process flow chart and block diagram illustrating the present invention.

Turning to FIG. 1, the entire system of the present invention 10 broadly includes a section 48 associated with a user's personal computer and a section 46 provided at a location remote from the personal computer and connected therewith by a standard wired or wireless telecommunications link or any other communications methodology. Each of the users who are part of the system according to the present invention, would be provided with appropriate software allowing each of the users to prepare individualized dual filters to automatically prevent certain unwarranted e-mail from being received as well as to automatically receive desired e-mail. The software can be installed directly by the user or would be resident within popular mail programs, and once installed be transparent to the user. One of these filters is automatically updated by other users in the system when known unwanted e-mail addresses are determined. This software would also allow the individual to use a customized graphic user interface to assemble the filters. A typical graphic user interface will be discussed in more detail hereinafter. However, it is noted that the exact nature of the graphic user interface can vary depending upon its application and implementation.

The software would allow the individual user to construct an automatic discard filter 12. The automatic discard filter is a collective term consisting of a user modified discard filter, a user personal address filter as well as a user personal string filter. During operation of the system, the automatic discard filter 12 would include a current filter list comprising a list of active e-mail addresses against which incoming e-mails are compared. This current filter list is retained in a memory section of the users computer. Any comparison between any incoming e-mail and the current filter list could be accomplished within the user's computer system. The current filter list is maintained at the remote central location 46 as well as being periodically updated in each of the users PC systems 48. The remote location 46 would include a delta filter server 22 and download server 24 for a particular user as well as delta server filter 26 from all other users. The current filter list can be modified by the user to personally remove any addresses therefrom through various deletion techniques, thereby providing the user with a user modified discard filter. The user personal address filter would include additional addresses the user has added to the current filter list as well as any character strings that the user has added via a text entry containing an "@". For the purpose of the present invention, a text entry is a character string entered into the system by keyboard typing. Typing is initiated by double clicking or highlighting and typing, thereby clearing an old string and creating a new string. When the mouse is clicked on some other location or "enter" is hit, the string will be entered into the appropriate memory structure for the new field.

The user personal string filter is defined as any character string that the user had added to the automatic discard filter to create a "No Admittance List" via text entry that does not contain the "@". The term "No Admittance List" would be a list of terms and addresses included to create the automatic discard filter. The "No Admittance List" 52 is included in the graphic user interface 50 illustrated in FIG. 2.

Figure 2:
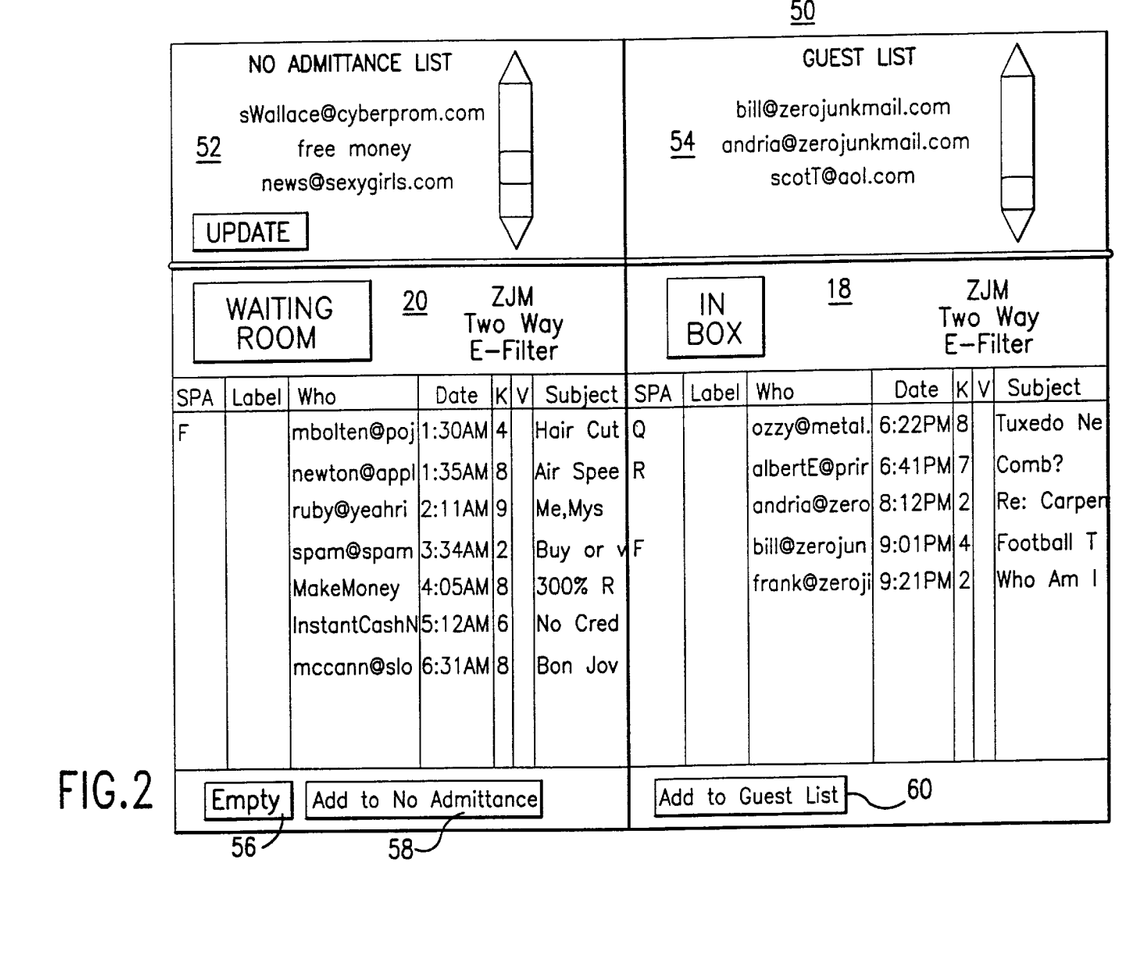
FIG. 2 is a typical example of a graphic user interface according to the present invention.

The Guest List Filter 14 includes addresses the user has personally added to the system, for example by dragging an e-mail to the "Guest List" 54 shown in the graphic user interface of FIG. 2, or by any other means. The Guest List Filter 14 also includes any character strings the user has added via a text entry containing an "@".

Any e-mail received by the user is checked against the automatic discard filter 12 to determine whether any character string on the "No Admittance List" 52 will bar entry of any e-mail with matching text in its address, subject line or message body. If this occurs, that e-mail will be eliminated from the users system as indicated by the Trash Bin 16.

Conversely, any address contained in the Guest List which matches an address of an incoming e-mail would be automatically forwarded to the In Box folder 18 for review by the user. Similar to the situation with respect to the No Admittance List 52, a text string entered in the Guest List 54 would forward all messages containing that character string to the "In Box" folder 18. This feature would allow users to receive on-demand direct marketing information from parties, promoting products for which the user has expressed interest based upon the text string entered in the Guest List 54.

Incoming e-mail which is not filtered by the automatic discard filter 12 based upon the No Admittance List 52 or is included in the guest list filter 14 as embodied in the Guest List 54 would be automatically sent to a Waiting Room folder 20 to be individually reviewed by the user.

Unknown e-mail stopped by the automatic discard filter 12 based upon the inclusion of an unwarranted character string or based upon a personal review by the user would be used to both automatically update the addresses included in the automatic discard filter as well as to alert other users in the system of the existence of objectionable e-mail addresses. These new addresses are periodically and automatically transmitted to a address filter server 22 provided at the remote central location 46. Based upon numerical and temporal factors as described hereinafter, these addresses are included on the current filter list associated with the address filter server 22 stored in a filter database associated with a database server 24 in communication with the address server 22.

Periodically, the database server 24 in communication with the address filter server 22 would download updated filter addresses to the various users in the system by constructing an address packet consisting of every address on the current filter list since the date and time of each of the users last update. The address packet is a data structure consisting of N strings of e-mail addresses and a variable containing the time of construction of the packet. The packet is compressed for downloading and uploading multiple e-mail addresses. Based upon the particular implementation of the software of the present invention, the updated version of the current filter list is substituted for the No Admittance List currently provided in the users system. Alternatively, since the No Admittance List might include addresses and character strings personally added by the user but not included in the current filter list, the updated filter list would be compared with the automatic discard filter and any additional entries not included in the automatic discard filter would be added thereto.

FIG. 2 illustrates the In Box folder 18 and the Waiting Room 20 in more detail as well as giving examples of the type of messages included therein. The list of names included on the automatic discard filter 12 are provided in the No Admittance List 20. Any incoming e-mail whose new address matches one of the addresses on this list is immediately discarded to Trash 16. Addresses may be added to this list via an update button 61, the Add to No Admittance button 58, text entry, or by dragging a selected e-mail to this window with the mouse. The update button 62 automatically downloads the latest automatic discard filter from the download server 24. The updated filter list is displayed in the No Admittance Window. Simultaneously, user added e-mail addresses are sent to the Delta Filter Server 22 for consideration in future updates to the users in the system.

The Waiting Room folder 20 includes only those e-mails that have successfully passed through both the automatic discard filter but are not included on the Guest List filter 54. Additionally, any e-mail from any folder may be selected and dragged into the Waiting Room 20 by the user using his or her mouse. The Waiting Room display as shown in FIG. 2 would include e-mail addresses, the date and time of receipt as well as the subject of the e-mail. The exact layout of this Waiting Room can be changed depending upon the users requirements.

An Empty button 56 is associated with the Waiting Room 20. This button discards all e-mails in the Waiting Room folder. If the folder is not empty, a pop up box will be displayed with a warning ensuring that the user wishes the Waiting Room to be emptied. If this is the case, a pop up button would allow the user to proceed. If the user does not wish to empty the e-mails in the Waiting Room, the initial request would be canceled and the e-mails included therein would not be cleared.

The Add to No Admittance button 58 associated with the Waiting Room 20 would add the addresses of all selected e-mails in the Waiting Room to the automatic discard filter. The No Admittance List in the no admittance window will scroll to reveal newly added addresses.

The Guest List window 54 would include a list of names on the Guest List filter. Any incoming e-mail whose new address matches one of the addresses on this list is immediately forwarded to the In Box folder 18. Addresses may be added to this list via the add to Guest List button 60, text entry, or by dragging a selected e-mail to this window with a mouse.

The In Box 18 includes only those e-mails that have successfully passed through both the automatic discard filter and the Guest List Filter. Additionally, any e-mail from any folder, may be selected and dragged into the In Box 18 by the user using the mouse. Similar to the Waiting Room 20 the In Box 18 includes the e-mail addresses, the date and time of receipt as well as the subject matter of the e-mail. Furthermore, the particular configuration of the In Box 18 as illustrated in FIG. 2 can be changed depending upon the users requirements. By clicking on an open slot in the No Admittance List 52 or the Guest List 54 or by double clicking on a existing text, the user may enter a character string to be checked in the filtering system. Any such character string on the No Admittance List will bar the entry of any e-mail with matching text in its address, subject line or message body. For example, as shown in the No Admittance List 52, any received e-mail with the words "free money" in its subject or message would be discarded. A text string similarly entered in the Guest List would forward all messages containing that character string to the In Box. Text entry can also be used to type in new e-mail addresses or edit existing ones on either of the filter lists.

The use of the click and drag technology would allow a graphic user to be used to transfer the address or character string of an e-mail to either the Admittance List or the Guest List.

Figure 3:
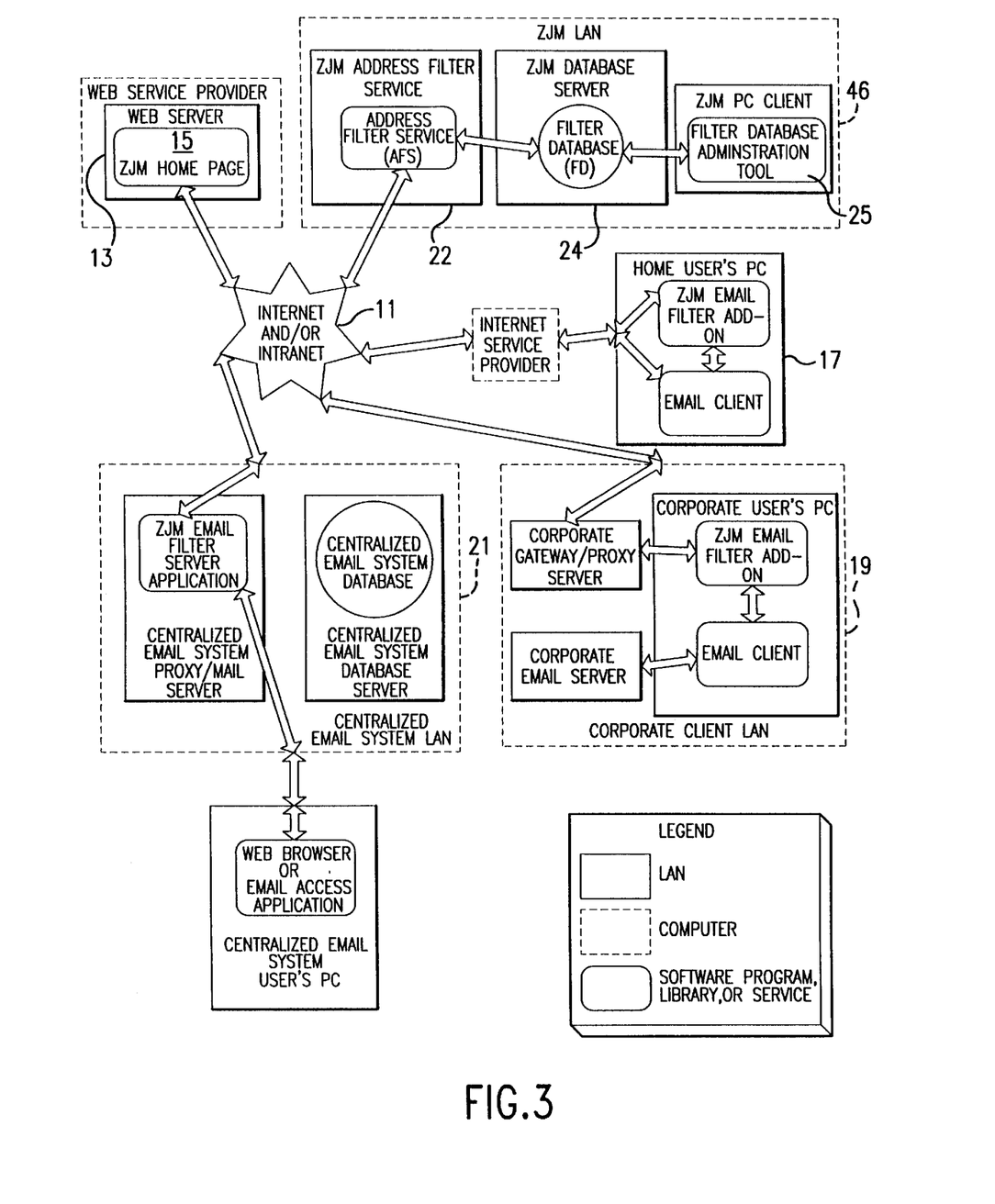
FIG. 3 is a block diagram showing various components of the present invention.

FIG. 3 illustrates a typical block diagram of the major components of the preset invention. The present invention can be utilized by a home user 17 or by a corporate user 19 connected to the Internet 11. The provider of the preset invention is also connected to the Internet and Intranet 11 allowing a web server 13 to advertise the present invention through a home page 15. The provider connected to the Internet and Intranet 11 at a second location allows the automatic discard filters 11 of the users to be particularly updated. A local area network (LAN), wide area network (WAN) or any other type of network provided at the remote location 46 allows the address filter server 22 to be in communication with the database server 24 as well as a filter database administration tool 25 allowing the provider to maintain complete control over the state of the address filter and the filter database. FIG. 3 also illustrates the Internet and Intranet 11 connections between a typical home user and a corporate user.

The address filter server 22 would relay e-mail filter user requests to the filter database of the database server 24 and meeting appropriate calls via RPC to a library on the database server or by sending SQL commences to the database directly. The address filter service will be implemented via connection based (TCP) communication. The sending of new addresses from an e-mail filter user to the filter database could be handled by connectionless (UDP) communication since failure to handle all new addresses is not critical.

FIG. 3 illustrates a situation in which the e-mail filtering can occur directly at the home user's PC 17 or a corporate user's PC 19 and communication is provided over the Internet and Intranet 11 to the remote location 46. However this invention can be practiced employing a centralized e-mail system database 21 connected to the home user's PC 17 or the corporate user's PC 19 through the Internet and Intranet 11. In this situation the filtering is accomplished at the centralized e-mail system database which is the location of the e-mail directed to the home user or the corporate user.

Figure 4:
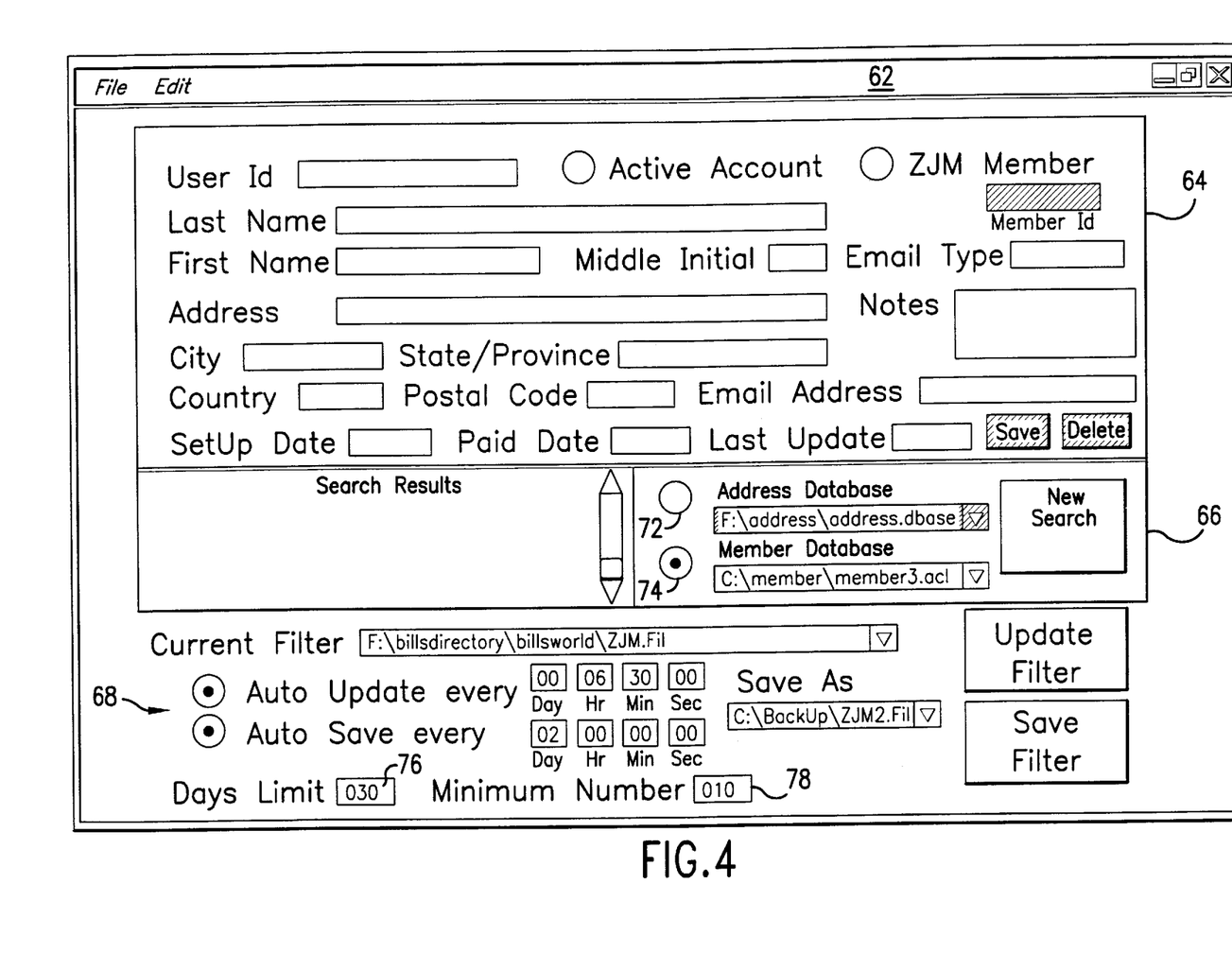
FIG. 4 is a typical control screen illustrating a new search on a member database.
Figure 5:
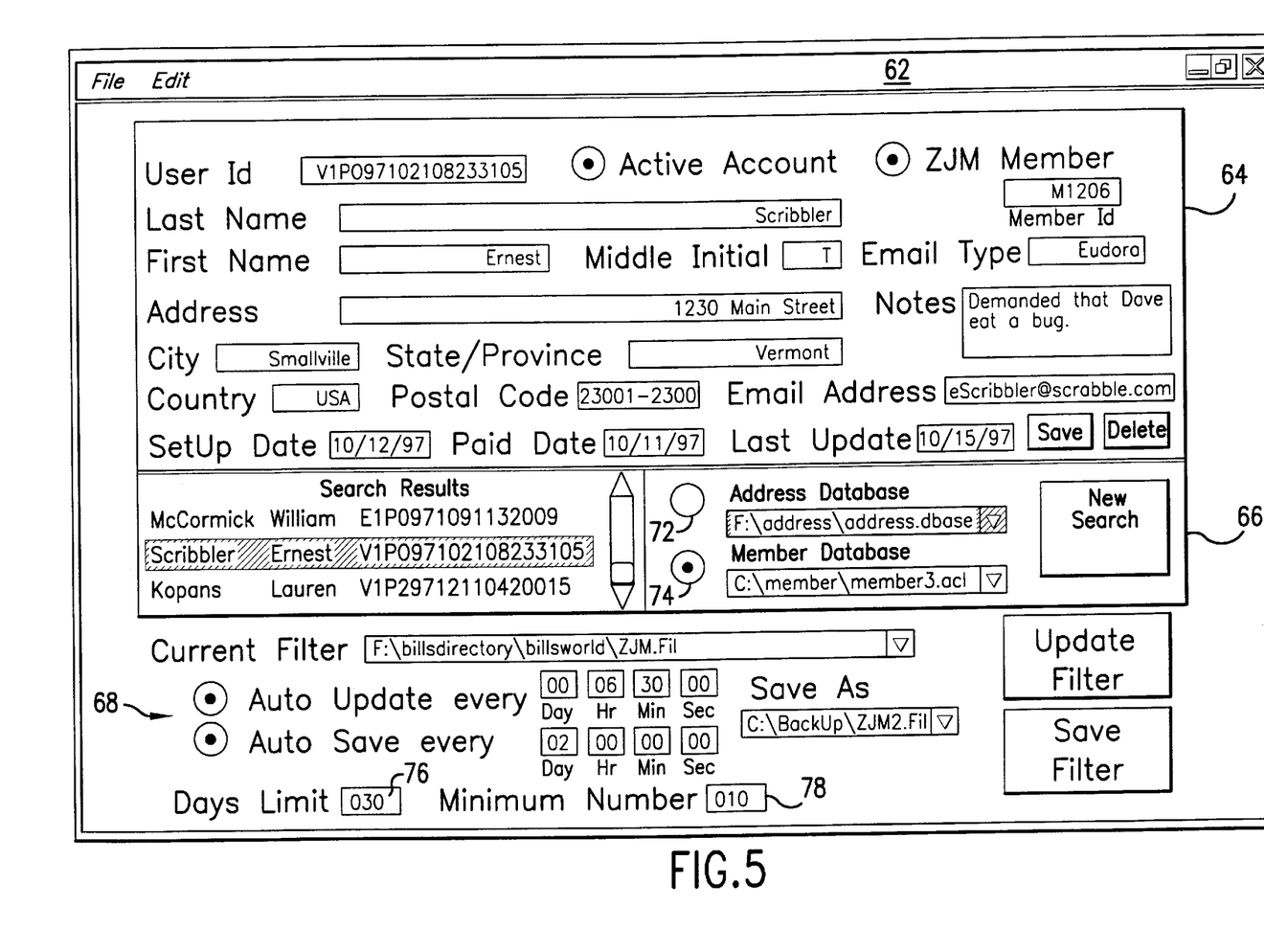
FIG. 5 is a control screen illustrating the search results of a member database.
Figure 6:
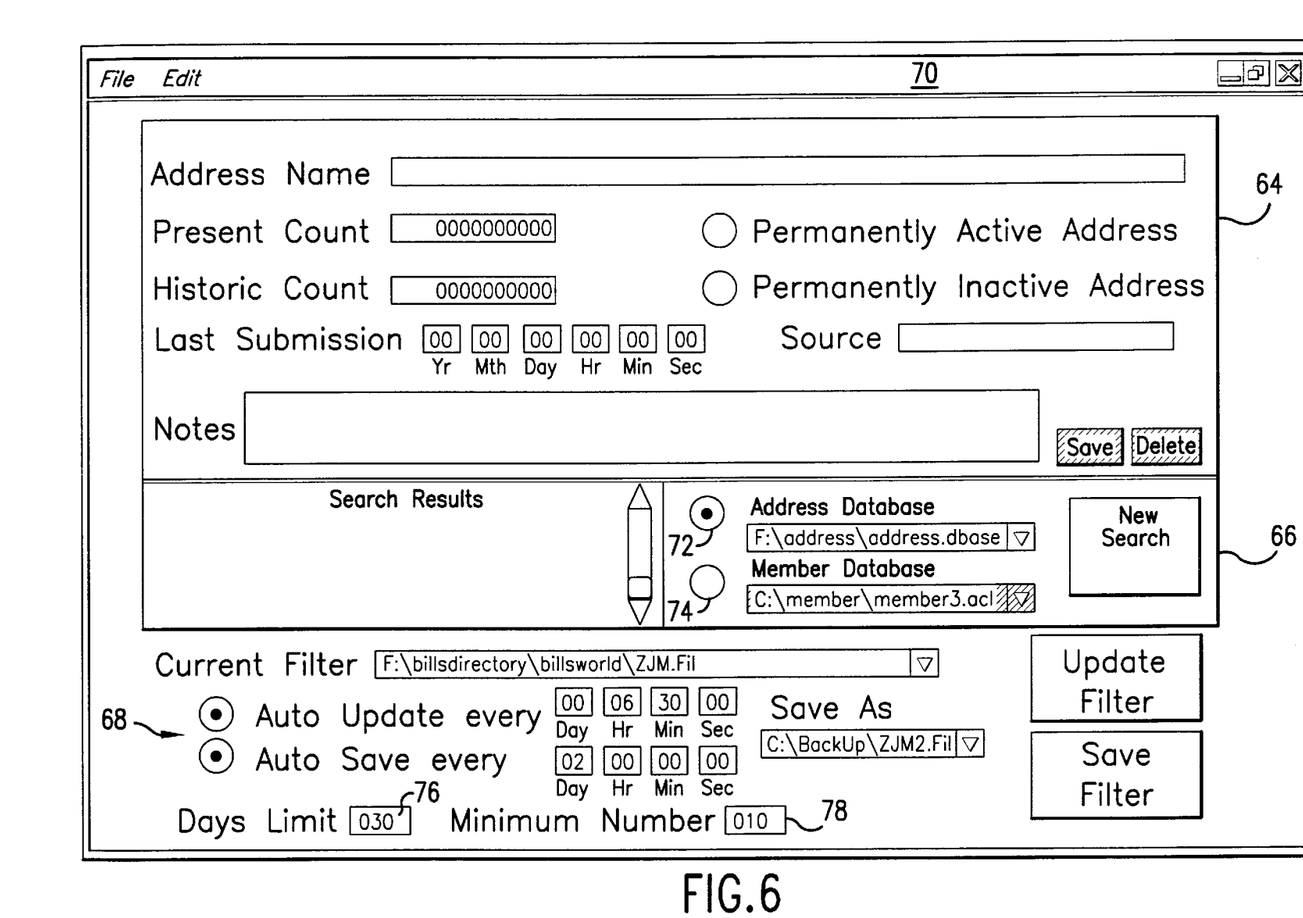
FIG. 6 is a control screen illustrating a new search on an address database.
Figure 7:
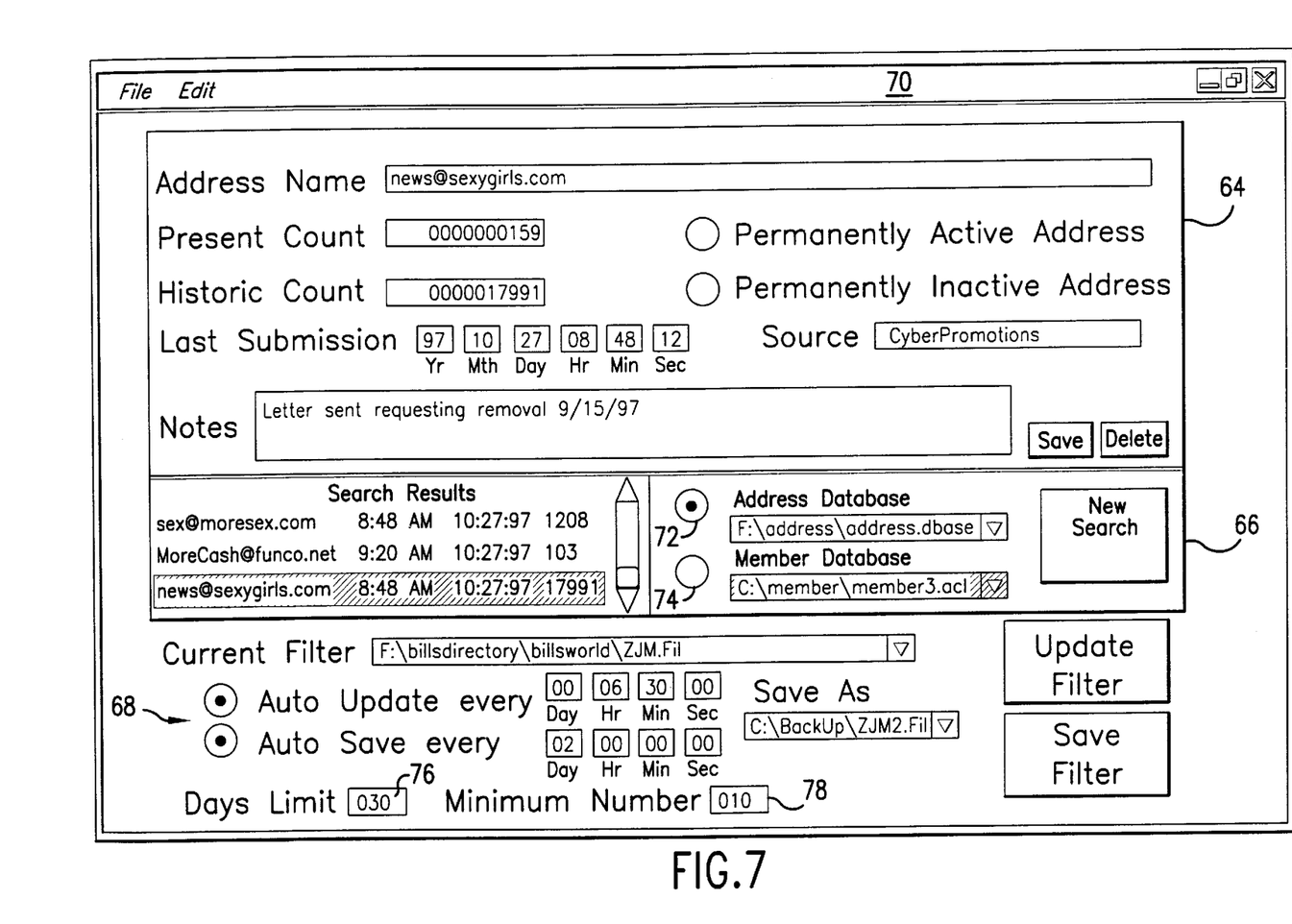
FIG. 7 is a control screen illustrating the search results of an address database.

FIGS. 4–7 illustrate typical control screens used by the administrator of the present system at a remote central location. These screens are used for maintaining, searching and editing both the address database which consists of every address that has been sent to the central location address filter server 22 or added via a centralized control interface as well as the member database consisting of all members who have set up and updated their software. FIG. 3 illustrates a "blank" address database screen and FIG. 4 illustrates this database screen when information has been entered therein.

Both the control screen for the member database 62 and the address database 70 contain a search field 64, a search panel 66 and a filter panel 68. The search field 64 would contain information matching an entry in either the address database or the member database. Buttons 72 and 74 would allow either of these databases to appear on the control screen. Both of these databases would include search results run in either the address database or the member database in Section 66. The current filter Section 68 would allow entries to be updated or saved at various times. It would also include a box 76 indicating the number of days an address can remain on the current filter list without a new instance of that address being uploaded by the filter users. It would also include a box 78 listing the minimum number of reportings required for an address to be placed on the current filter list. Certainly both of these central screens can be set up in multitude of ways depending upon the specific information to be provided.

Returning to FIG. 1, the process of comparing received e-mails to both the Automatic Discard filter 12 and the Guest List filter 14 will now be explained. Incoming e-mails 28, 30 and 32 are compared to information contained in the user modified discard filter, the user personal address filter and the users personal string filter utilizing the address line, the subject line as well as the message body. Since the information included in e-mails 28, 30 and 32 are not contained in the automatic discard filter, all three of these e-mails are directly transmitted to the Guest List filter 14. The e-mail addresses, subject line and message body of these three e-mails result in a match for all three of these e-mails. Consequently, these e-mails are sent to the In Box folder 18.

E-mails 34 and 36 were sent from a known bulk e-mailer. Since information in these e-mails are included in the automatic discard filter 12, both of these e-mails are directly sent to trash 16.

Four unknown e-mails 38, 40, 42, and 44 are initially sent to the automatic discard filter 12. E-mail filter 38 is automatically stopped by the automatic discard filter and sent to trash 16. Although the address of this e-mail is not initially included in the automatic discard filter 12 the subject line or message body contains a character string included in the automatic discard filter. The address of this e-mail is automatically added to the discard filter 12. During the next master filter update, this new junk e-mail address will be forwarded to the Delta Filter Server 22. E-mail 40 passes through the automatic discard filter 12 and is stopped by the Guest List filter 14 and is then forwarded to the Waiting Room folder 20. Upon review, the user decides to place this address on the automatic discard filter. Future e-mails from the same sender will be sent to trash. During the next master filter update, this new e-mail would be forwarded to the Delta Filter Server 22. E-mail 42 passes through the automatic discard filter 12 and is stopped by the Guest List filter 14 and is then forwarded to the Waiting Room folder 20. The user reviews this e-mail and decides to place it on the Guest List. Future e-mails from the same sender will be sent to the In Box folder 18.

E-mail 44 passes through the automatic discard filter and is stopped by the Guest List filter 14 and sent to Waiting Room 20. Since the user took no action with respect to this e-mail, it would remain in the Waiting Room folder.

The present invention has been explained with respect to specific arrangements and methods. However, it is noted that these arrangements and methods are merely illustrative of the principles of the present invention. Numerous modifications in form and detail may be made by those of ordinary skill in the art without departing from the scope of the present invention. Although this invention has been shown in relation to a particular preferred embodiment, it should not be considered to be so limited.

What is claimed is:

1. A system for filtering electronic mail for a plurality of user computers received over a communication medium to each of the user computers comprising:

a first filter provided in each of the user computers provided with a first list of addresses from which the user does not wish to receive electronic mail;

a second filter provided in each of the user computers provided with a second list of addresses from which the user does wish to receive electronic mail;

comparison device provided in each of the user computers for comparing the addresses included in said first filter and said second filter with the address of electronic mail received by the user computers, wherein any electronic mail whose address is discovered by said comparison device to be included in said first list of addresses will be automatically deleted from that particular user computer, and further wherein any electronic mail whose address is discovered by said comparison device to be included in said second list of addresses would be retained in that particular user computer for review by the user;

a first folder for retaining electronic mail received in a user computer whose address is not included in either said first list of addresses or said second list of addresses for review by the user at a later time, and further including an update device for adding addresses to said first filter or said second filter based upon the user's review, thereby creating a first updated list of first addresses and a first updated list of second addresses;

a device for periodically sending said first updated list of first addresses from a plurality of user computers to a master database situated at a location remote from the user's computer thereby creating an updated master database of addresses received from the user computers; and a device provided at said location remote from the user's computers for including addresses of said undated master database only if the same address is sent to said master database by a predetermined number of user computers.

2. The system in accordance with claim 1, further including a second folder for retaining electronic mail received in the computer whose address is not included in said first list of addresses but is included in said second list of addresses.

3. The system in accordance with claim 1 further including a device for periodically sending said first updated list of first addresses to a master database situated at a location remote from the user's computer.

4. The system in accordance with claim 1, further including a device in each user computer for periodically receiving said updated master database addresses including additional addresses to be added to said first filter to create a second updated list of first addresses.

5. A system for filtering electronic mail provided with a first list of addresses from which the user does not wish to receive electronic mail as well as a first list of objectionable character strings;

a second filter provided in each of the user computers provided with a second list of addresses from which the user does wish to receive electronic mail as well as a second list of acceptable character strings;

comparison device provided in each of the user computers for comparing the addresses and character strings included in said first filter and said second filter with the address of electronic mail as well as character strings provided in the electronic mail received by the user computers, wherein any electronic mail whose address is discovered by said comparison device to be included in said first list of addresses or electronic mail containing a character string included in the first list of objectionable characters string, will be automatically deleted from that particular user computer, and further wherein any electronic mail whose address is discovered by said comparison device to be included in said second list of addresses or said second list of acceptable character strings, would be retained in that particular user computer for review by the user;

a first folder for retaining electronic mail received in the computer whose address is not included in said first list of addresses, said first list of objectionable character strings, said second list of addresses or said second list of acceptable character strings, for review by the user at a later time, and further including an update device for adding addresses to said first filter or said second filter based upon the user's review, creating a first updated list of first addresses and a first updated list of second addresses;

a device for periodically sending said first updated list of addresses from a plurality of user computers to a master database situated at a location remote from the user's computer, thereby creating an updated master database of addresses received from the user computers; and a device provided at said location remote from the user's computers for including addresses of said updated master database only if the same address is sent to said master database by a predetermined number of user computers.

6. The system in accordance with claim 5, further including a second folder for retaining electronic mail received in the computer whose address is not included in said first list of addresses, said first list of objectionable character strings, in said second list of addresses or said second list of acceptable character strings.

7. The system in accordance with claim 5, further including a device in each user computer for periodically said undated master database of addresses including additional addresses to be added to said first filter to create a second updated list of first addresses.

8. A system for filtering electronic mail transmitted on a communication medium comprising:

one or more user computers connected to the communications medium, each of said computers including a first filter provided in each of said computers provided with a first list of addresses from which a user does not wish to receive electronic mail, a second filter provided in said computers provided with a second list of addresses from which the user does wish to receive electronic mail, a comparison device provided in each of the computers for comprising the addresses included in said first filter and said second filter with the address of electronic mail received by said computer, a first folder for retaining electronic mail received in said computer whose address is not included in said first list of addresses but is included in said second list of addresses, a second folder for retaining electronic mail received in said computer whose address is not included in either said first list of addresses or said second list of addresses for review by the user at a later time, and further including an updated device for adding addresses to said first filter based upon the user's review, thereby creating a first updated first list of addresses; and master server and master database connected to said one or more computers by the communication medium for periodically receiving said first updated first list of addresses from each of said user computers to be inserted into said master database thereby creating an updated master database of addresses received from said user computer and for periodically transmitting to each of said user computers a list of addresses to be added to said first filter to create second updated list of first addresses; and a device provided at said location remote from the user's computers for including addresses of said updated master database only if the same address is sent to said master database by a predetermined number of user computers.

9. A method for filtering electronic mail received over a communications medium at a user's computer comprising:

creating a first list of addresses from which each user does not wish to receive electronic mail;

inputting said first list of addresses into the user's computer as a first filter;

creating a second list of addresses from which the user does wish to receive electronic mail inputting said second list of addresses into the user's computer as a second filter;

comparing the addresses included in said first and second list of addresses with the address of a received electronic mail;

automatically deleting the electronic mail form the user's computer if the address of the electronic mail is included in said first list of addresses;

retaining the electronic mail in a first location in the computer if the address of the electronic mail is in said second list of addresses or retaining the electronic mail in a second location in the computer if the address of the electronic mail is not included in either said first list of addresses or said second list of addresses;

reviewing any electronic mail included in said second location;

eliminating any unwanted electronic mail based upon said reviewing step;

recording the electronic address of any unwanted electronic mail in said first filter to create a first updated list of first addresses;

periodically transmitting said first updated list of first addresses to a master database situated at a remote location to create an updated master database of addresses received from a plurality of user computers; and wherein any address in said first updated list of first addresses is added to said master database to create said undated master database only if the said address is sent to said master database by a predetermined number of user commuters.

10. The method in accordance with claim 9, further including the step of periodically transmitting said updated master database to a plurality of user computers to produce a second updated list of first addresses to be included into said first filter.

11. The method in accordance with claim 9, wherein said first filter includes a list of objectionable character strings compared to character strings included in a received electronic mail.

12. A system for filtering electronic mail for a plurality of user computers received over a communication medium to each of the user computers comprising:

a first filter provided in each of the user computer provided with first a list of objectionable character strings from which the user does not wish to receive electronic mail if at least one of said objectionable character strings is included in the electronic mail;

a second filter provided in each of the user computers provided with a second list of acceptable character strings from which the user does wish to receive electronic mail if at least one of said acceptable character strings is included in the electronic mail;

comparison device provided in each of the user computers for comparing the character strings included in said first filter and said second filter with the subject line and body of electronic mail received by the user computers, wherein any electronic mail which includes a character string discovered by said comparison device to be included in said first list of objectionable character strings will be automatically deleted from that particular user computer, and further wherein any electronic mail which includes a character string discovered by said comparison device to be included in said second list of character strings would be retained in the user's computer for review by the user;

a first folder for retaining electronic mail received in the computer not included in character strings provided in either said first or second lists for review by the user at a later time, and further including a update device for adding character strings to said first filter or said second filter based upon the user's review, thereby creating a first updated first list of objectionable character strings and an updated second list of acceptable character strings;

a device for periodically sending said first updated first list of objectionable character strings to a master database situated at a location remote from the user's computer thereby creating an updated master database of objectionable character strings received from the user computers; and a device provided at said location remote from the user's computer for including objectionable character strings in said updated master database only if the same objectionable character string is sent to said master database by a predetermined number of user computers.

13. The system in accordance with claim 12, further including a second folder for retaining electronic mail received in the computer whose subject line and body does not include a character string proceed in said first list of character strings but is included in said second list of character strings.

14. The system in accordance with claim 12, further including a device in each user computer for periodically receiving said updated master database of objectionable character strings to be added to said first filter.

15. A system for filtering electronic mail for a plurality of user computers received over a communication medium by each of the user computers comprising:

a first filter located at a location remote from the user computers provided with first a list of addresses from which the user does not wish to receive electronic mail;

a second filter located at the location provided remote from the user computers with a second list of addresses from which the user does wish to receive electronic mail;

comparison device located at the location remote from the user computers for comparing the addresses included in said first filter and said second filter with the address of electronic mail received at the location remote from the user computers and directed to the user, wherein any electronic mail whose address is discovered by said comparison device to be included in said first list of addresses will be automatically deleted from location remote from the user computers, and further wherein any electronic mail whose address is discovered by said comparison device to be included in said second list of addresses would be transmitted from the location remote from the user computers to a particular user computer for review by the user;

a first folder for retaining electronic mail received at the location remote from the user computers whose address is not included in either said first list of addresses or said second list of addresses for review by the user at a later time, and further including an update device for adding addresses to said first filter or said second filter based upon the user's review, thereby creating a first updated list of first addresses and a first updated list of second addresses;

a device for periodically sending said first updated list of first addresses from a plurality of user computers to a master database situated at a location remote from the user computers thereby creating an updated master database of addresses produced by the user computers; and a device provided at said location remote from the user's computers for including addresses of said updated master database only if the same address is sent to said master database by a predetermined number of user computers.

16. The system in accordance with claim 15, further including a second folder for retaining electronic mail received at the central location whose address is not included in said first list of addresses but is included in said second list of addresses.

17. The system in accordance with claim 15, further including a device for periodically receiving said updated master database of addresses including additional addresses to be added to said first filter to create a second updated list of first addresses.

18. A system for filtering electronic mail remote from the user computers received over a communication medium by each of the user computers comprising:

a first filter located at a location remote from the user computers provided with a first list of addresses from which the user does not wish to receive electronic mail as well as a first list of objectionable character strings;

a second filter located at the location remote from the user computers provided with a second list of addresses from which the user does wish to receive electronic mail as well as a second list of acceptable character strings;

comparison device located at the location remote from the user computers for comparing the addresses and character strings included in said first filter and said second filter with the address of electronic mail as well as character strings provided in the electronic mail received at the location remote from the users computers, wherein any electronic mail whose address is discovered by said comparison device to be included in said first list of addresses or electronic mail containing a character string included in the first list of objectionable character strings, will be automatically deleted from the location remote from the user computers, and further wherein any electronic mail whose address is discovered by said comparison device to be included on said second list of addresses or said second list of acceptable character strings, would be transmitted from the location remote from the user computers to a particular user computer for review by the user;

a first folder for retaining electronic mail received at the location remote from the user computers whose address is not included in said first list of addresses, said first list of objectionable character strings, said second list of addresses or said second list of acceptable character strings, for review by the user at a later time, and further including an update device for adding addresses to said first filter or said second filter based upon the user's review, thereby creating a first updated list of addresses and a first updated list of second addresses;

a device for periodically sending said first updated list of addresses from a plurality of user computers to a master database situated at a location remote from the user computers thereby creating an updated master database having addresses and character strings provided by the user computers; and a device provided at said location remote from the user's computers for including addresses of said updated master database only if the same address is sent to said master database by a predetermined number of user computers.

19. The system in accordance with claim 18, further including a second folder for retaining electronic mail received at the central location whose address is not included in said first list of addresses, said first list of objectionable character strings, said second list of addresses or said second list of acceptable character strings.

20. The system in accordance with claim 18, further including a device for periodically receiving said updated master database of addresses and character strings including additional addresses and character strings to be added to said first filter to create a second updated list of first addresses.

21. A method for filtering electronic mail received over a communications medium be reviewed by a user computer comprising, in a system including a plurality of users computers:

creating a first list of addresses at a location removed from the user computers and connected to the communications medium thereby creating a first filter;

creating a second list of addresses from which the user does wish to receive electronic mail;

introducing said second list of addresses to the location removed from the user computers connected to the communication medium, thereby creating a second filter;

comparing the addresses included in said first and second list of addresses with the address of an electronic mail received at the location removed from the user computers;

automatically deleting the electronic mail from the location removed from the user computers if the address of the electronic mail is included in said first list of addresses;

retaining the electronic mail in a first location in the location removed from the user computers if the address of the electronic mail is in said second list of addresses or retaining the electronic mail in a second location in the location removed from the user computers if the address of the electronic mail is not included in either said first list of addresses or said second list of addresses;

reviewing any electronic mail included in said second location;

eliminating any unwanted electronic mail based upon said reviewing step;

recording the electronic address of any unwanted electronic mail in said first filter to create a first updated list of first addresses;

periodically transmitting said first updated list of first addresses to a master database situated at a remote location to create an updated master database of addresses received from a plurality of user computers; and wherein any address in said first updated list of first addresses is added to said master database to create said updated master database only if the said address is sent to said master database by a predetermined number of user computers.

22. The method in accordance with claim 21, further including the step of periodically transmitting said updated master database to the location remote from the user computers to produce a second updated list of first addresses to be included into said first filter.

23. The method in accordance with claim 21, wherein said first filter includes a list of objectionable character strings compared to character strings included in a received electronic mail.

* * * * *